(12) United States Patent
Cheng et al.

(10) Patent No.: US 9,451,570 B2
(45) Date of Patent: Sep. 20, 2016

(54) DEVICE DISCOVERY FOR DEVICE-TO-DEVICE COMMUNICATION

(75) Inventors: Fang-Chen Cheng, Randolph, NJ (US); Said Tatesh, Swindon (GB)

(73) Assignee: Alcatel Lucent, Boulogne-Billancourt (FR)

( * ) Notice: Subject to any disclaimer, the term of this patent is extended or adjusted under 35 U.S.C. 154(b) by 632 days.

(21) Appl. No.: 13/598,199

(22) Filed: Aug. 29, 2012

(65) Prior Publication Data

US 2014/0064263 A1     Mar. 6, 2014

(51) Int. Cl.
  *H04J 3/06*       (2006.01)
  *H04W 56/00*    (2009.01)
  *H04W 8/00*      (2009.01)
  *H04W 76/02*    (2009.01)

(52) U.S. Cl.
  CPC ........... *H04W 56/002* (2013.01); *H04W 8/005* (2013.01); *H04W 76/023* (2013.01)

(58) Field of Classification Search
  CPC ....... H04L 41/12; H04L 45/02; H04L 45/00; H04L 45/04; H04L 41/04; H04B 7/2125; H04B 7/2126; H04B 7/2622; H04W 56/00; H04W 56/0045; H04W 56/002; H04W 8/005; H04W 76/023; H04J 3/0638; H04J 3/0685
  USPC ................. 370/254, 324, 350, 503
  See application file for complete search history.

(56) References Cited

U.S. PATENT DOCUMENTS

| | | | | |
|---|---|---|---|---|
| 8,588,774 | B2* | 11/2013 | Klein et al. | 455/434 |
| 8,665,799 | B2* | 3/2014 | Malladi et al. | 370/329 |
| 2009/0046683 | A1* | 2/2009 | Jung et al. | 370/338 |
| 2010/0165882 | A1* | 7/2010 | Palanki et al. | 370/254 |
| 2011/0026413 | A1* | 2/2011 | Swarts et al. | 370/252 |
| 2011/0182280 | A1* | 7/2011 | Charbit et al. | 370/350 |
| 2011/0268101 | A1* | 11/2011 | Wang | H04L 5/0053 370/344 |
| 2011/0306341 | A1 | 12/2011 | Klein et al. | |
| 2011/0317569 | A1* | 12/2011 | Kneckt et al. | 370/252 |

FOREIGN PATENT DOCUMENTS

| | | |
|---|---|---|
| WO | 2011130630 A1 | 10/2011 |
| WO | WO 2011130630 | 10/2011 |
| WO | WO 2011130630 A1 * | 10/2011 |

OTHER PUBLICATIONS

Brian (Bong Youl) Cho, Mobility Group—Intel 5.3GPP LTE, May 2008.

(Continued)

*Primary Examiner* — Mark Rinehart
*Assistant Examiner* — Natali N Pascual Peguero
(74) *Attorney, Agent, or Firm* — Davidson Sheehan LLP

(57) ABSTRACT

Embodiments of the claimed subject matter provide a method and apparatus for device discovery in device-to-device (D2D) communication. One embodiment of the method includes generating first information indicative of a first synchronization signal in response to a request from a first user equipment to be authenticated for D2D communication with one or more second user equipment. The first information corresponds to a sequence used to generate a primary synchronization signal for transmission by a serving cell for the first user equipment. This embodiment of the method also includes providing the first information to the first user equipment so that the first user equipment can transmit the first synchronization signal.

36 Claims, 7 Drawing Sheets

(56) References Cited

OTHER PUBLICATIONS

3GPP TSG RAN Meeting #55m RP-120416, Xiamen, PRC, Feb. 28-Mar. 2, Feb. 28, 2012 revision of RP-120386, *Qualcomm Incorporated*, Study on LTE Device to Device Communications: Direct Discovery Radio Aspects.

International Search Report and Written Opinion correlating to PCT/US13/56323 dated Dec. 2, 2013, 14 pages.

* cited by examiner

DEVICE DISCOVERY FOR DEVICE-TO-DEVICE COMMUNICATION

BACKGROUND

This application relates generally to communication systems, and, more particularly, to wireless communication systems.

Wireless communication systems provide wireless connectivity to user equipment using a network of interconnected access nodes or base stations. Communication over the air interface between the user equipment and the base stations take place according to various agreed-upon standards and/or protocols. For example, the Third Generation Partnership Project (3GPP, 3GPP2) has specified a set of standards for a packet-switched wireless communication system referred to as Long Term Evolution (LTE). The LTE standards support access schemes including single-carrier frequency division multiple access (SC-FDMA). Multiple users can concurrently access the SC-FDMA network using different sets of non-overlapping Fourier-coefficients or sub-carriers. One distinguishing feature of SC-FDMA is that it leads to a single-component carrier transmit signal. The LTE standards also support multiple-input/multiple-output (MIMO) communication over the air interface using multiple antennas deployed at transmitters and/or receivers. The carrier bandwidth supported by LTE is approximately 20 MHz, which can support a downlink peak data rate of approximately 100 Mbps and a peak data rate of the uplink of approximately 50 Mbps.

User equipment may implement transceivers that include a transmitter for transmitting uplink signals towards the network and a receiver for receiving downlink signals transmitted by the network. Transceivers implemented in user equipment may communicate according to the SC-FDMA standards or protocols using different sets of non-overlapping Fourier-coefficients or sub-carriers. User equipment conventionally communicate with each other by transmitting signals over a communication path that originates at the transmitter of the first user equipment, travels over an uplink (or reverse link) to a receiver in a network base station, proceeds to a transmitter in the receiving base station or another base station, and is then transmitted over a downlink (or forward link) to a receiver in the second user equipment.

SUMMARY OF EMBODIMENTS

The following presents a simplified summary of the disclosed subject matter in order to provide a basic understanding of some aspects of the disclosed subject matter. This summary is not an exhaustive overview of the disclosed subject matter. It is not intended to identify key or critical elements of the disclosed subject matter or to delineate the scope of the disclosed subject matter. Its sole purpose is to present some concepts in a simplified form as a prelude to the more detailed description that is discussed later.

As discussed herein, user equipment typically communicate with each other by exchanging signals via network elements that are included in the communication path between the user equipment. However, uplink signals transmitted by one user equipment may be received by other user equipment as if they were downlink signals transmitted by the network. User equipment may therefore implement device-to-device communication that does not necessarily require a network to mediate the communication session. When user equipment are very close to each other, they may use more resources communicating via the network than they would use establishing a over-the-air connection that directly connects the user equipment. Moreover, in some circumstances such as emergency situations or natural disasters the network may not be available to mediate communication between user equipment. Future generations of wireless communication protocols are therefore likely to support device-to-device communication that does not necessarily include the network in the communication path. Current user equipments are not able to discover the presence of other user equipment to initiate device-to-device communication. The disclosed subject matter is directed to addressing the effects of one or more of the problems set forth above.

In one embodiment, a method is provided for device discovery in device-to-device (D2D) communication. One embodiment of the method includes generating first information indicative of a first synchronization signal in response to a request from a first user equipment to be authenticated for D2D communication with one or more second user equipment. The first information corresponds to a sequence used to generate a primary synchronization signal for transmission by a serving cell for the first user equipment. This embodiment of the method also includes providing the first information to the first user equipment so that the first user equipment can transmit the first synchronization signal. Embodiments of the method may be implemented in a controller.

In another embodiment, a method is provided for device discovery in D2D communication. One embodiment of the method includes providing, from a first user equipment, a request to be authenticated for device-to-device (D2D) communication with at least one second user equipment. This embodiment of the method also includes receiving, at the first user equipment and in response to the request, first information indicative of a first synchronization signal corresponding to a sequence used to generate a primary synchronization signal for transmission by a serving cell for the first user equipment. Embodiments of the method may be implemented in user equipment.

In yet another embodiment, a method is provided for device discovery in D2D communication. One embodiment of the method includes detecting, at a second user equipment, a first synchronization signal transmitted by a first user equipment that is authenticated for device-to-device (D2D) communication. The first synchronization signal corresponds to a sequence used to generate a primary synchronization signal for transmission by a serving cell for the first user equipment. This embodiment of the method also includes transmitting an acknowledgment preamble from the second user equipment in response to detecting the first synchronization signal. Embodiments of the method may be implemented in user equipment.

BRIEF DESCRIPTION OF THE DRAWINGS

The disclosed subject matter may be understood by reference to the following description taken in conjunction with the accompanying drawings, in which like reference numerals identify like elements, and in which.

Figure 1:
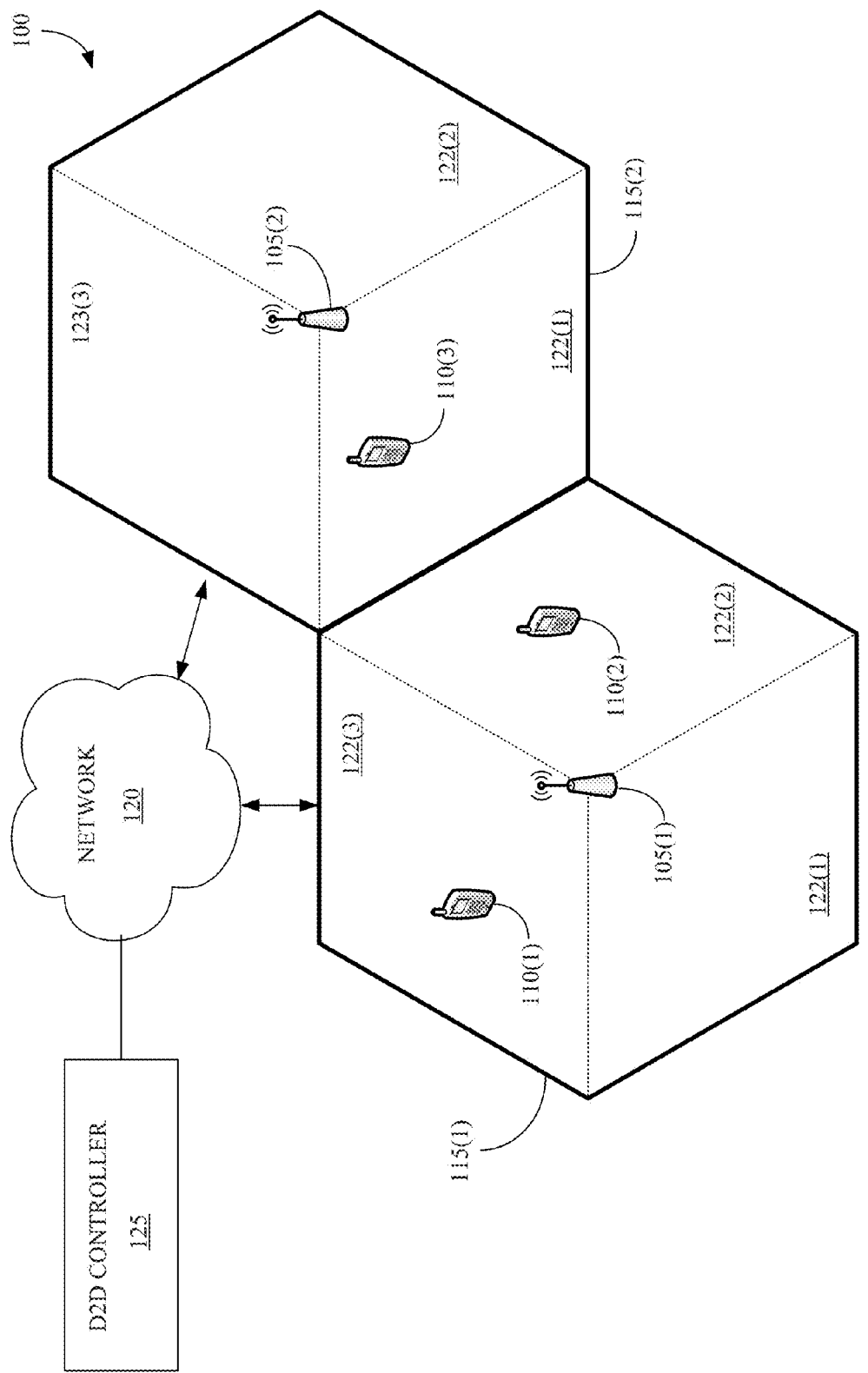
FIG. 1 conceptually illustrates one exemplary embodiment of a wireless communication system.

While the disclosed subject matter is susceptible to various modifications and alternative forms, specific embodiments thereof have been shown by way of example in the drawings and are herein described in detail. It should be understood, however, that the description herein of specific embodiments is not intended to limit the disclosed subject matter to the particular forms disclosed, but on the contrary, the intention is to cover all modifications, equivalents, and alternatives falling within the scope of the appended claims.

DETAILED DESCRIPTION OF SPECIFIC EMBODIMENTS

Illustrative embodiments are described below. In the interest of clarity, not all features of an actual implementation are described in this specification. It will of course be appreciated that in the development of any such actual embodiment, numerous implementation-specific decisions should be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure. The description and drawings merely illustrate the principles of the claimed subject matter. It should thus be appreciated that those skilled in the art may be able to devise various arrangements that, although not explicitly described or shown herein, embody the principles described herein and may be included within the scope of the claimed subject matter. Furthermore, all examples recited herein are principally intended to be for pedagogical purposes to aid the reader in understanding the principles of the claimed subject matter and the concepts contributed by the inventor(s) to furthering the art, and are to be construed as being without limitation to such specifically recited examples and conditions.

The disclosed subject matter is described with reference to the attached figures. Various structures, systems and devices are schematically depicted in the drawings for purposes of explanation only and so as to not obscure the description with details that are well known to those skilled in the art. Nevertheless, the attached drawings are included to describe and explain illustrative examples of the disclosed subject matter. The words and phrases used herein should be understood and interpreted to have a meaning consistent with the understanding of those words and phrases by those skilled in the relevant art. No special definition of a term or phrase, i.e., a definition that is different from the ordinary and customary meaning as understood by those skilled in the art, is intended to be implied by consistent usage of the term or phrase herein. To the extent that a term or phrase is intended to have a special meaning, i.e., a meaning other than that understood by skilled artisans, such a special definition is expressly set forth in the specification in a definitional manner that directly and unequivocally provides the special definition for the term or phrase. Additionally, the term, "or," as used herein, refers to a non-exclusive "or," unless otherwise indicated (e.g., "or else" or "or in the alternative"). Also, the various embodiments described herein are not necessarily mutually exclusive, as some embodiments can be combined with one or more other embodiments to form new embodiments.

As discussed herein, future generations of wireless communication protocols are likely to support device-to-device (D2D) communication that does not necessarily include the network in the communication path. User equipment operating in systems that support device-to-device communication should be able to discover other user equipment so that the user equipment can establish communication links over the air interface. In some embodiments, user equipment may be able to communicate with the network during the discovery process and in some cases the network may monitor the D2D communication, e.g., for radio resource management and billing purposes. However, in other embodiments, such as emergency situations or natural disasters, user equipment should be able to discover each other without assistance from the network. In either case, a mechanism for authenticating user equipment before allowing them to participate in D2D communication should be available.

Embodiments of the wireless communication system described herein may therefore allocate a first synchronization signal to user equipment so that the user equipment can transmit the first synchronization signal to indicate that it is available for D2D communication with other user equipment. In one embodiment, the first synchronization signal may be a first UE-specific synchronization signal that is formed by combining a scrambling sequence allocated to the user equipment and a frequency domain sequence associated with a serving cell for the user equipment. The first UE-specific synchronization signal can be auto-correlated by a receiving UE to discover the transmitting UE and estimate timing for the D2D communication. In one embodiment, a second synchronization signal may be allocated to the user equipment. The second synchronization signal may be a second UE-specific synchronization signal that may be used to determine frame timing boundaries. In one embodiment, user equipment may also be assigned a sounding reference signal for D2D communication. User equipment may use the sounding reference signals to estimate the quality of the channel between the user equipment involved in the D2D communication. The first UE-specific synchronization signal, the second UE-specific synchronization signal, or the sounding reference signal may be allocated to the user equipment in response to a request to initiate D2D communication. Alternatively, this information may be provided to user equipment prior to initiating D2D communication, e.g., the user equipment may be pre-configured for D2D communication. User equipment may transmit the first UE-specific synchronization signal, the second UE-specific synchronization signal, or the sounding reference signal in configurable symbols of slots in the frame.

FIG. 1 conceptually illustrates one exemplary embodiment of a wireless communication system 100. In the illustrated embodiment, the wireless communication system 100 includes one or more base stations 105 that are configured to provide wireless connectivity to user equipment 110 in corresponding cells 115. The illustrated embodiment of the wireless communication system 100 also includes a network 120 for facilitating communication between network elements such as the base stations 105 and other elements within the system 100 or elements that are external to the system 100. Communication between the base stations 105 and user equipment 110 may be performed according to the Long Term Evolution (LTE) standards or protocols defined by the Third Generation Partnership Project (3GPP, 3GPP2) for packet-switched wireless communication systems. However, persons of ordinary skill in the art having benefit of the present disclosure should appreciate that the standards or protocols are intended to be exemplary and alternative embodiments may use other standards or protocols for supporting communication within the wireless communication system 100.

Each cell 115 is subdivided into sectors 122, 123 that may be served independently. For example, the base stations 105 may implement or deploy antenna configurations and hardware, firmware, or software that allows the user equipment 110 in the different sectors 122, 123 to be served independently. User equipment 110 may hand off when they transition between different sectors 122, 123. Although the cells 115 are depicted in FIG. 1 as perfect hexagons and the sectors 122, 123 are depicted as identical parallelograms that perfectly subdivide the cells 115, persons of ordinary skill in the art having benefit of the present disclosure should appreciate that actual cells 115 or sectors 122, 123 may have irregular shapes that may vary in time due to geography, topography, environmental conditions, configuration of the base stations 105, changing antenna configurations, or other factors.

Transmissions over the air interface are divided into frames to facilitate synchronization of communication between the base stations 105 and user equipment 110.

Figure 2:
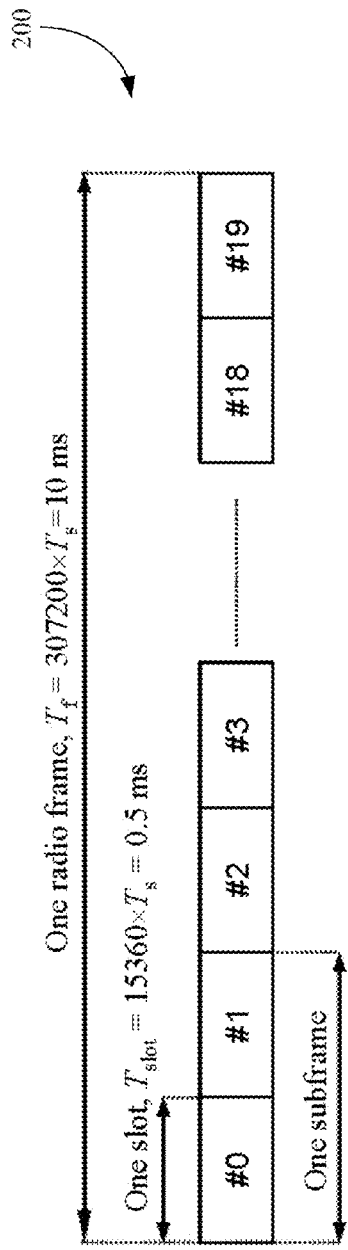
FIG. 2 conceptually illustrates one exemplary embodiment of a radio frame that may be used for frequency division duplex transmissions over the air interface.
Figure 3:
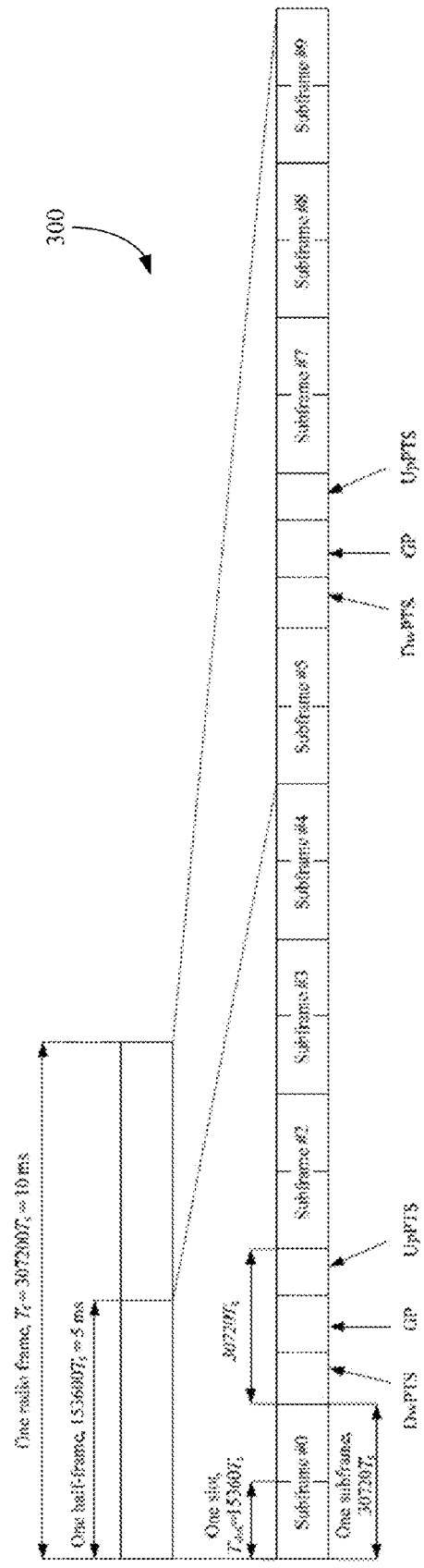
FIG. 3 conceptually illustrates one exemplary embodiment of a radio frame that may be used for time division duplex transmissions over the air interface.

FIG. 2 conceptually illustrates one exemplary embodiment of a radio frame 200 that may be used for frequency division duplex transmissions over the air interface. In the illustrated embodiment, the frame 200 is divided into subframes that are further divided into slots. FIG. 3 conceptually illustrates one exemplary embodiment of a radio frame 300 that may be used for time division duplex transmissions over the air interface. The frame 300 is divided into half-frames, which are further divided into a plurality of subframes. One subset of the subframes may be divided into two slots. Special subframes may include slots that are used to convey the downlink pilot signal (DwPTS) and the uplink pilot signal (UpPTS). The uplink and downlink pilot signal slots are separated by a guard band (GP).

Figure 4:
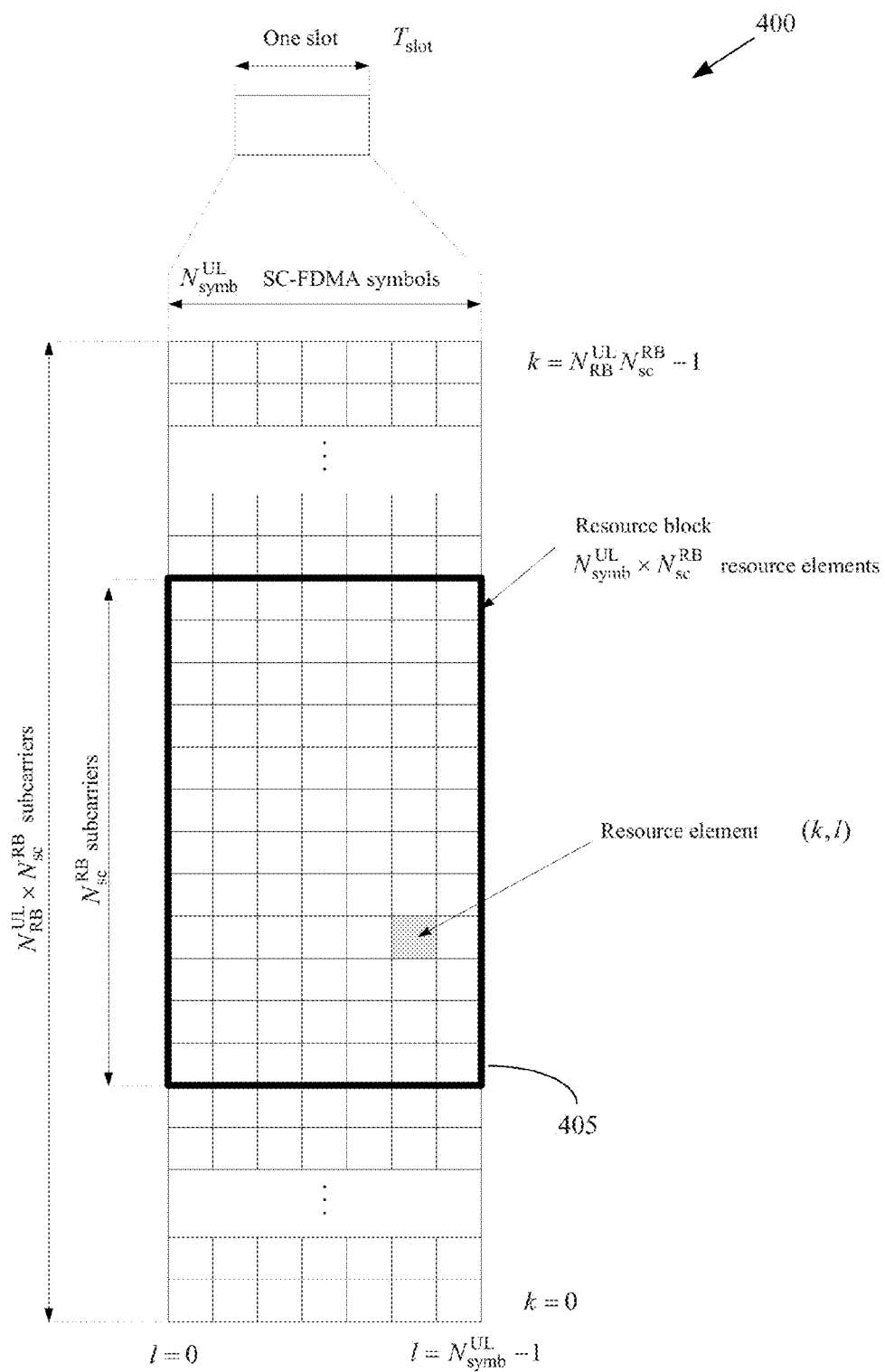
FIG. 4 conceptually illustrates one exemplary embodiment of a slot.

FIG. 4 conceptually illustrates one exemplary embodiment of a slot 400. In the illustrated embodiment, the slot 400 is an uplink component carrier that is used for single carrier frequency division multiple access (SC-FDMA) communication over an air interface. Embodiments of structures such as the structure of the slot 400 depicted in FIG. 4 may also be used for downlink slots. FIG. 4 depicts one exemplary uplink time slot, $T_{slot}$. The transmitted signal in each slot is described by one or several resource grids 405 of $N_{RB}^{UL} N_{sc}^{RB}$ subcarriers and $N_{symb}^{UL}$ SC-FDMA symbols. The quantity $N_{RB}^{UL}$ depends on the uplink transmission bandwidth configured in the cell and in embodiments that conform to the 3GPP standards, the quantity fulfills the condition:

$$N_{RB}^{min,UL} \leq N_{RB}^{UL} N_{RB}^{max,UL}$$

where $N_{RB}^{min,UL}=6$ and $N_{RB}^{max,UL}=110$ are the smallest and largest uplink bandwidths, respectively, supported by the current version of the specification. The number of SC-FDMA symbols in a slot may depend on the cyclic prefix length configured by a higher layer parameter UL-CyclicPrefixLength.

Each element in the resource grid 405 may be referred to as a resource element and can be uniquely defined by the index pair (k,l) in a slot where k=0, ..., $N_{RB}^{UL} N_{sc}^{RB}-1$ and l=0, ..., $N_{symb}^{UL}-1$ are the indices in the frequency and time domains, respectively. Resource element (k,l) on antenna port p corresponds to the complex value $a_{k,l}^{(p)}$. When there is no risk for confusion, or no particular antenna port is specified, the index p may be dropped. Quantities $a_{k,l}^{(p)}$ corresponding to resource elements not used for transmission of a physical channel or a physical signal in a slot may be set to zero. A physical resource block may be defined as $N_{symb}^{UL}$ consecutive SC-FDMA symbols in the time domain and $N_{sc}^{RB}$ consecutive subcarriers in the frequency domain. Exemplary values of $N_{symb}^{UL}$ and $N_{symb}^{RB}$ are given by Table 1. In the illustrated embodiment, a physical resource block in the uplink consists of $N_{symb}^{UL} \times N_{sc}^{RB}$ resource elements, corresponding to one slot in the time domain and 180 kHz in the frequency domain.

TABLE 1

Exemplary resource block parameters.

| Configuration | $N_{sc}^{RB}$ | $N_{symb}^{UL}$ |
|---|---|---|
| Normal cyclic prefix | 12 | 7 |
| Extended cyclic prefix | 12 | 6 |

The relation between the physical resource block number $n_{PRB}$ in the frequency domain and resource elements (k,l) in a slot may be given by the formula:

$$n_{PRB} = \left\lfloor \frac{k}{N_{sc}^{RB}} \right\rfloor$$

Referring back to FIG. 1, the base stations 105 may transmit various signals that can be used for establishing uplink or downlink communication channels, synchronizing communications over the air interface, estimating channel qualities, and the like. In the illustrated embodiment, the base stations 105 may transmit a primary synchronization signal (PSS), a secondary synchronization signal (SSS), a sounding reference signal (SRS), a common reference signal (CRS), or other signals. The PSS and SSS may be used for initial timing acquisition, cell identification, and cyclic prefix (CP) length detection. The SRS or CRS may be used for time tracking, frequency synchronization, RRM measurements, or other purposes. In one embodiment, some of these signals may be generated using the physical cell identity of the base station 105. For example, the physical cell identity $N_{ID}^{CELL}$ may be defined as:

$$N_{ID}^{CELL} = 3 N_{ID}^{(1)} + N_{ID}^{(2)}$$

where $N_{ID}^{(1)}$ is the physical layer cell identity group (which has a value that can range from 0 to 167) and $N_{ID}^{(2)}$ is the identity within the group (which has a value that can range from 0 to 2). The physical cell identity can therefore define 504 unique physical cell identities for the base stations 105. However, persons of ordinary skill in the art having benefit of the present disclosure should appreciate that this identification scheme is illustrative and alternative embodiments may use other identifying schemes.

The PSS sequence may be generated from a frequency-domain Zadoff-Chu sequence according to:

$$d_u(n) = \begin{cases} e^{-j\frac{\pi u n(n+1)}{63}} & n = 0, 1, \ldots, 30 \\ e^{-j\frac{\pi u(n+1)(n+2)}{63}} & n = 31, 32, \ldots, 61 \end{cases}$$

The root index may be 25, 29, or 34 for the PSS so that different sequences can be used to cover 3 different cells or sectors such as the sectors 122(1-3), 123(1-3). The length 62 PSS sequence maps to central 62 REs of the spectrum such as the resource elements depicted in FIG. 4. For frame structure type 1, such as shown in FIG. 2, the primary synchronization signal may be mapped to the last OFDM symbol in slots 0 and 10. For frame structure type 2, such as shown in FIG. 3, the primary synchronization signal may be mapped to the third OFDM symbol in subframes 1 and 6. The detected PSS sequence may also be used as the scrambling sequence for the detection of the SSS. In one embodiment, the PSS allocation is at a fixed location at the last symbol in slots 0 and 10 for both Frame structure 1 and 2 for UE to identify the frame boundary.

The SSS may be generated by combining two length-31 sequences. The sequences that are used to define the secondary synchronization signal for subframe 0 and subframe 5 may be different:

$$d(2n) = \begin{cases} s_0^{(m_0)}(n)c_0(n) & \text{in subframe } 0 \\ s_1^{(m_1)}(n)c_0(n) & \text{in subframe } 5 \end{cases}$$

$$d(2n+1) = \begin{cases} s_1^{(m_1)}(n)c_1(n)z_1^{(m_0)}(n) & \text{in subframe } 0 \\ s_0^{(m_0)}(n)c_1(n)z_1^{(m_1)}(n) & \text{in subframe } 5 \end{cases}$$

where $0 \leq n \leq 30$. The indices $m_0$ and $m_1$ may be derived from the physical-layer cell-identity group $N_{ID}^{(1)}$ according to:

$$m_0 = m' \bmod 31$$
$$m_1 = (m_0 + \lfloor m'/31 \rfloor + 1) \bmod 31$$
$$m' = N_{ID}^{(1)} + q(q+1)/2,$$
$$q = \left\lfloor \frac{N_{ID}^{(1)} + q'(q'+1)/2}{30} \right\rfloor,$$
$$q' = \lfloor N_{ID}^{(1)}/30 \rfloor$$

The sequence d(n) may be mapped to resource elements (such as the resource elements shown in FIG. 4) according to:

$$a_{k,l} = d(n),$$
$$n = 0, \ldots, 61$$
$$k = n - 31 + \frac{N_{RB}^{DL} N_{sc}^{RB}}{2}$$
$$l = \begin{cases} N_{symb}^{DL} - 2 & \text{in slots 0 and 10 for frame structure type 1} \\ N_{symb}^{DL} - 1 & \text{in slots 1 and 11 for frame structure type 2} \end{cases}$$

Once the cell ID group indices $m_0$ and $m_1$ in SSS are detected, the physical cell identifier (PCID) may be derived. User equipment 105 may then start to demodulate the common reference signal (CRS) for the acquisition and tracking of the downlink transmission time after PCID acquisition.

The wireless communication system 100 includes one or more D2D controllers 125 that are used to configure or control D2D communication within the wireless communication system 100. As used herein, the term "D2D communication" refers to communication between user equipment 110 that does not include network elements such as base stations 105 in the communication path between the user equipment. Thus, D2D communication occurs over an air interface established between the user equipment 110 involved in the D2D communication session. The D2D communication can occur over an air interface established between two user equipment or over an air interface shared by more than two user equipment. Although network elements such as the base stations 105 are not in the communication path during D2D communication, the network may still participate in or monitor the communication. For example, the network may provide a network timing that can be used by the user equipment 110 as the reference time for deriving the timing of other user equipment during the D2D communication. Furthermore, the network may monitor D2D communication between two or more user equipment, e.g., so that the network can manage the radio resource and control the users for "leasing" air interface resources for the D2D communication.

The D2D controller 125 is depicted in FIG. 1 as a stand-alone entity that can communicate with the base stations 105 via the network 120. However, persons of ordinary skill in the art having benefit of the present disclosure should appreciate that the D2D controller 125 may be deployed in different locations or in a distributed fashion at multiple locations in alternative embodiments of the wireless communication system 100. For example, embodiments of the D2D controller 125 may be implemented in the base stations 105 or at other locations within the wireless communication system 100. In one embodiment, the D2D controller 125 may be used to authenticate user equipment for D2D communication in two different modes: the network-assist mode and the network-absent mode. In the network-assist mode, network side elements such as the base stations 105 or the D2D controller 125 are available and can communicate with user equipment 110. The user equipment 110 may therefore use a network timing reference for communication with the network as well as D2D communication. The network may also provide D2D authentication, authorization, communication parameters, and the like concurrently with user equipment 110 initiating D2D communication in the network-assist mode. In the network-absent mode, the network is not available to provide a network timing reference or other information, such as signaling control and system information, to the user equipment. Thus, user equipment 110 that participate in network-absent D2D communication may have been pre-configured or pre-authorized to perform D2D communication without any network assistance or intervention at the time of the D2D communication session.

In one embodiment that implements the network-assist mode, the wireless communication system 100 may authorize user equipment 110 for D2D communication in response to a request from the user equipment 110 and before the user equipment 110 performs device discovery to detect other user equipment 110. The requesting user equipment 110 may have acquired LTE system information and locked to the downlink timing of its serving cell 115 before the user equipment 110 is authorized to perform the D2D device discovery or communication. The requesting user equipment 110 may discover other user equipment 110 by detecting a sounding reference signal (SRS) and so the user equipment 110 may be configured to transmit periodic SRS with a configurable time interval that may be known by other devices in the wireless communication system 100. In the illustrated embodiment, the user equipment 110 that is requesting D2D communication has acquired a reference time for a frame or subframe boundary from LTE network. User equipment 110 may therefore use the LTE network time as the reference time for discovery of devices in the wireless communication system 100. However, in some embodiments the uplink transmission time for the user equipment 110 may be advanced based on the TA command, which may create an offset between the downlink system timing and the UE transmission time. The device discovery procedure in the network control mode is considered as network-assisted device discovery.

User equipment 110 that are authorized to participate in D2D communication may be configured to transmit synchronization signals such as a UE-specific primary synchronization signal (U-PSS) or a UE-specific secondary synchronization signal (U-SSS). In one embodiment, user equipment 110 that are authorized for network-assisted device discovery may transmit the U-PSS and U-SSS in the same subframe as the configured SRS transmission for a specific device. In one embodiment, the U-PSS and U-SSS may be derived using a constant-amplitude, zero autocorrelation (CAZAC) function such as a Zadoff-Chu sequence that is configured using parameters provided by the serving cell for the user equipment 110. For example, the root sequence and symbol allocation for transmitting the U-PSS and U-SSS could be configured to correspond to the PSS and SSS of the serving cell. In that case, the U-PSS and U-SSS may be configured using the same parameters or indices as the sequences that are used to configure the PSS and SSS for the serving cell. Additional UE-specific scrambling sequences s(n) may then be applied to identify the particular user equipment 110. For example, the U-PSS may be generated from the function:

$$U(n) = S(n)d_u(n) = \begin{cases} s(n) * e^{-j\frac{\pi u n(n+1)}{63}} & n = 0, 1, \ldots, 30 \\ s(n) * e^{-j\frac{\pi u (n+1)(n+2)}{63}} & n = 31, 32, \ldots, 61 \end{cases}$$

The U-SSS may also be derived using a similar generalization of the SSS for the serving cell, e.g., using the SSS and a UE-specific scrambling sequence.

The U-PSS and U-SSS may then be allocated to specific resource blocks for transmission over the air interface. For example, the center 6 RBs of one symbol in the OFDM time slots may be allocated for transmission of the U-PSS over the air interface and the center 6 RBs of another symbol in the OFDM time slots may be allocated for transmission of the U-SSS over the air interface. In one embodiment, the allocated symbols may be selected by applying a UE-specific OFDM symbol offset in transmitting U-PSS and U-SSS. For example, user equipment 110 may transmit U-PSS and U-SSS in symbols that are offset relative to the SRS symbol based on configured SRS cyclic shift.

Figure 5:
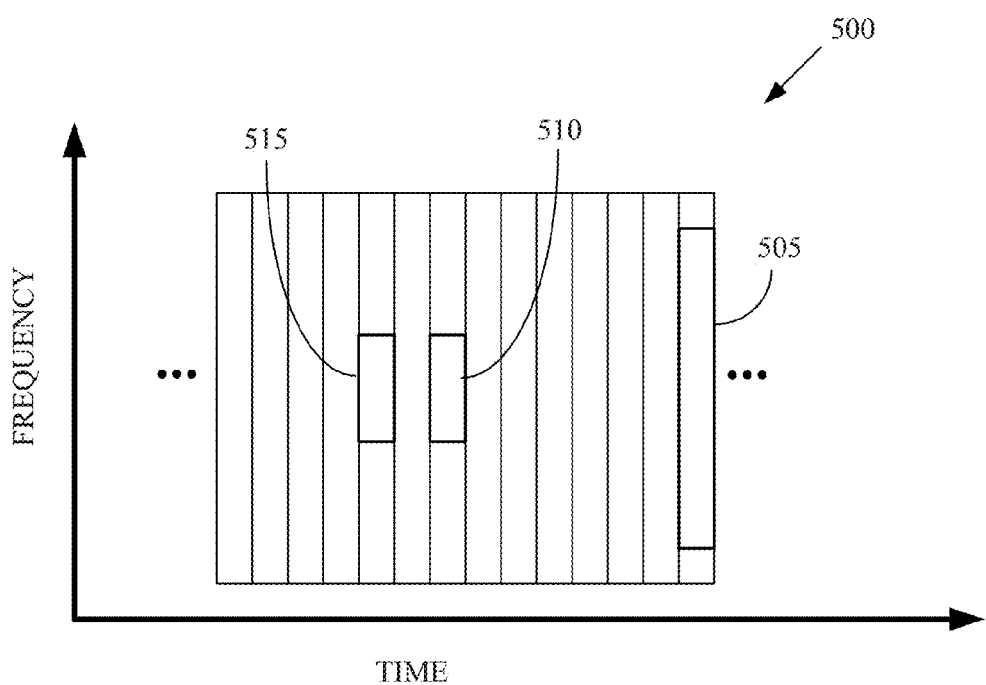
FIG. 5 conceptually illustrates a plurality of symbols.

FIG. 5 conceptually illustrates a plurality of symbols 500. In the illustrated embodiment, the horizontal axis indicates increasing time and the vertical axis indicates the different frequencies of the subcarriers that form the symbol. The sounding reference signal (SRS) 505 is transmitted in the last symbol and the U-PSS 510 and U-SSS 515 are transmitted at configurable offsets relative to the SRS 505. In the illustrated embodiment, the U-PSS 510 is transmitted with a five symbol offset relative to the SRS 505 and the U-SSS 515 is transmitted with a seven symbol offset relative to the SRS 505. However, persons of ordinary skill in the art having benefit of the present disclosure should appreciate that alternative embodiments may use different symbol offsets, which may be fixed or dynamically allocated so that the offsets are different in different time slots. In alternative embodiments, the symbol offset could also be at a fixed location, e.g. the U-PSS could be transmitted in the last symbol of slots 0 and 10 if higher layer signaling provides the SRS cyclic shift of the target device.

Referring back to FIG. 1, the D2D controller 125 may configure the UE-specific scrambling sequence during the setup procedure of D2D communication. Since the configuration of SRS and the cyclic shift may be UE specific within a cell, the configurable symbol location for U-PSS and U-SSS may also be UE-specific. Once the synchronization signals for authorized user equipment 110 have been generated by the D2D controller 125, the D2D controller 125 may provide information indicating the scrambling sequence for the authorized user equipment 110 to other user equipment 110 within the wireless communication system 100. The other user equipment 110 that receive the scrambling sequence may then perform a cell search procedure to acquire the timing of U-PSS and U-SSS and discover the user equipment 110 that is identified by the scrambling sequence. The user equipment 110 may then compare the acquired timing of U-PSS and U-SSS with the downlink system timing provided by the wireless communication system 100 and determine the "symbol offset" relative to the last symbol of SRS transmission. In some cases, there may be a range of uncertainty in the symbol offset due to different propagation delay between the user equipment 110 since the timing of the user equipment 110 that transmits the U-PSS/U-SSS is based on the CA command relative to the serving cell. In one embodiment, the transmission power of U-PSS/U-SSS may be power controlled to avoid interference to other cells, as discussed herein. User equipment 110 may therefore derive the SRS root sequence from the PCID and the cyclic shift from the symbol offset from detected U-PSS/U-SSS. User equipment 110 may also discover other user equipment for D2D communication after acquisition of SRS and fine tune the received timing using the other synchronization signals. In one embodiment, if there is a PUSCH transmission at the RBs scheduled to transmit the U-PSS/U-SSS, the PUSCH REs overlapped with U-PSS/U-SSS REs may be punctured so that the synchronization signals may be transmitted.

In one embodiment that implements the network-absent mode, the wireless communication system 100 may authorize user equipment 110 for D2D communication feature prior to user equipment 110 initiating D2D communication so that the user equipment 110 is pre-authorized or pre-configured for D2D communication in the event that the network becomes unavailable or absent. The network-absent mode may be particularly useful to support D2D communication in emergency situations, during natural disasters, and other situations where public safety is at risk. Prior to operating in the network-absent mode, user equipment 110 may be pre-authorized by the D2D controller 125 for subsequent D2D communication when the network is not available to assist device discovery.

Authorized user equipment 110 may then be allocated synchronization signals that may be generated by the D2D controller 125. In one embodiment, the root sequence for the U-PSS or U-SSS may be preconfigured based on the physical cell identifier of the current serving cell. The SRS cyclic shift may be determined using preconfigured parameters. In one embodiment, the U-PSS and U-SSS may be transmitted in the fixed symbol locations and so the SRS cyclic shift may also be configured in advance. For example, the SRS cyclic shift could be configured as a random cyclic shift within [0, 7]. In that case, the device performing discovery may perform hypothesis testing of 8 possible cyclic shifts to determine the correct cyclic shift of the UE in the device discovery process. Since the device may not have acquired fine timing, it may take some time for the device to perform the hypothesis testing and derive the correct cyclic shift. The advantage to using a random cyclic shift is that SRS collisions between randomly located user equipment 110 may be reduced. For another example, the SRS cyclic shift could be configured to be a fixed cyclic shift for some or all devices in the pre-configuration. In that case a fixed value of cyclic shift, e.g. a cyclic shift of 0, may be used. The device performing discovery may then look for the pre-configured cyclic shift value during detection. One disadvantage to using a fixed value of the cyclic shift is that the SRS collision probability may be increased (e.g., relative to the random cyclic shift case) when the devices are randomly distributed throughout the wireless communication system 100.

User equipment 110 may establish the network-absent mode of D2D communication in response to determining that the network is not available or present. In one embodiment, user equipment 110 may transmit access requests towards the network and may determine that the network is not present after failure of a preconfigured number of access attempts. Once the user equipment 110 determines that the network is not present, the user equipment 110 may initiate the network-absent mode and begin transmitting the allocated U-PSS and U-SSS without additional UE-specific scrambling as a network node. The timing of U-PSS and U-SSS transmission may be determined using random timing relative to a local oscillator maintained by the user equipment 110, pre-configured timing of the subframe, preconfigured subframe timing relative to the timing reference provided by a Global Positioning System (GPS), or other timing reference. The user equipment 110 is also pre-configured to transmit periodic SRSs with a configurable period in the same subframe as the U-PSS and U-SSS. Since no reference for the frame boundary is available in the network-absent mode, the U-PSS and U-SSS may be configured at the symbol location to be the same as that of the PSS/SSS for the serving cell that performs the pre-configuration of the user equipment 110. For example, the U-PSS and U-SSS may be configured for transmission in the last symbol of slots 0 and 10. The U-PSS/U-SSS and U-SRS should be configured together.

Transmission power of U-PSS and U-SSS indicates the coverage area of the device for other devices to discover and the appropriate power setting can facilitate the device discovery procedure. The transmission power for the synchronization signals may therefore be configured by the D2D controller 125. In one embodiment, the power setting of SRS 41 authorize user equipment 110 may allow other user equipment 110 to retrieve the timing in order to support device-to-device communication. For the network-assisted mode, the transmission power of U-PSS and U-SSS could be configured at the same time as the root sequences are configured. The network may know the location of the user equipment 110 that is requesting authorization and may also be aware of the locations or proximity of other user equipment 110. Since SRS is power controlled to its serving cell, the proximate user equipment 110 may derive a power difference between the SRS power and the U-PSS/U-SSS and use this power difference to determine the power setting for D2D communication with the authorized user equipment 110. For network-absent mode, the transmission power of U-PSS/U-PSS and SRS may be pre-configured for initial transmission. In one embodiment, a power ramping procedure may also be preconfigured to allow a gradual increase of transmission power from the authorized user equipment 110. For example, the transmission power may be increased in steps of $\Delta P$ after a preconfigured period $\Delta T$ if no handshaking acknowledgement is received from other user equipment 110. If the transmission power reaches a configurable maximum transmission power, and no handshaking acknowledgment has been received from any other user equipment 110, the power setting may cycle back to the initial transmission power. The ramping procedure may then begin again from the initial transmission power. Embodiments of this technique may be used to reduce power consumption in the user equipment 110 when no other user equipment 110 are available for D2D communication.

Once target user equipment 110 has been discovered by discovering user equipment 110, the discovering user equipment 110 may send back an acknowledgement preamble (AP) to the target user equipment 110 for handshaking to support establishing a wireless communication link between the user equipment 110. For the network-assisted mode, the discovering user equipment 110 may receive (from the network) the UE-specific scrambling sequence that identifies the target user equipment 110. In the illustrated embodiment, the AP is derived from a root index similar to that for the PSS except that the root index of the AP has a value that is different that the PSS, e.g., values other than the values 25, 29, or 34. The AP may also be scrambled by the UE-specific scrambling sequence for the discovering user equipment 110 so that the same cell search circuitry in the user equipment 110 can be reused for AP detection. For example, the AP may be defined as:

$$AP(n) = S(n)d_u(n) = \begin{cases} s(n) * e^{-j\frac{\pi un(n+1)}{63}} & n = 0, 1, \ldots, 30 \\ s(n) * e^{-j\frac{\pi u(n+1)(n+2)}{63}} & n = 31, 32, \ldots, 61 \end{cases}$$

In one embodiment, the AP root sequence may be fixed for some or all devices for D2D communication or configured by the network during the setup. The AP may be transmitted by the discovering user equipment 110 at a configurable number of k subframe(s) after the U-PSS/U-SSS subframe. The configurable number k may be a fixed value or alternatively be configurable number may be configurable by the network. In one embodiment, the symbol location of AP within the subframe could be a fixed location, e.g., last symbol of slot 0+2k or 10+2k or network configured. The target device would try to detect the AP after being configured for D2D communication and transmitting U-PSS/U-SSS.

For the network-absent mode, the discovering user equipment 110 may receive the UE-specific scrambling sequence of the target user equipment 110 from the network. The AP root index may be determined based on a function that is similar to the PSS but using index other than values 25, 29, or 34. The AP may also be scrambled by the SRS cyclic shift sequence C(n) of the target user equipment 110:

$$AP(n) = C(n)d_u(n) = \begin{cases} c(n)*e^{-j\frac{\pi un(n+1)}{63}} & n = 0, 1, \ldots, 30 \\ c(n)*e^{-j\frac{\pi u(n+1)(n+2)}{63}} & n = 31, 32, \ldots, 61 \end{cases}$$

where $c(n) = 3*\left\lfloor \frac{n}{3} \right\rfloor + \text{cyclic\_shift}$

The AP root sequence may be fixed in the pre-configuration of the user equipment 110 in the wireless communication system 100. In one embodiment, the AP may be transmitted by the discovering user equipment 110 at a configurable number of k subframes after the U-PSS/U-SSS subframe. In alternative embodiments, the configurable number k may be a fixed value determined in the pre-configuration or it may be a dynamically configurable number. In one embodiment, the symbol location of AP within the subframe may be a fixed location, e.g., last symbol of slot 0+2k or 10+2k preconfigured by the network. The target user equipment 110 may try to detect the AP after being configured for D2D communication and transmitting U-PSS/U-SSS.

Figure 6:
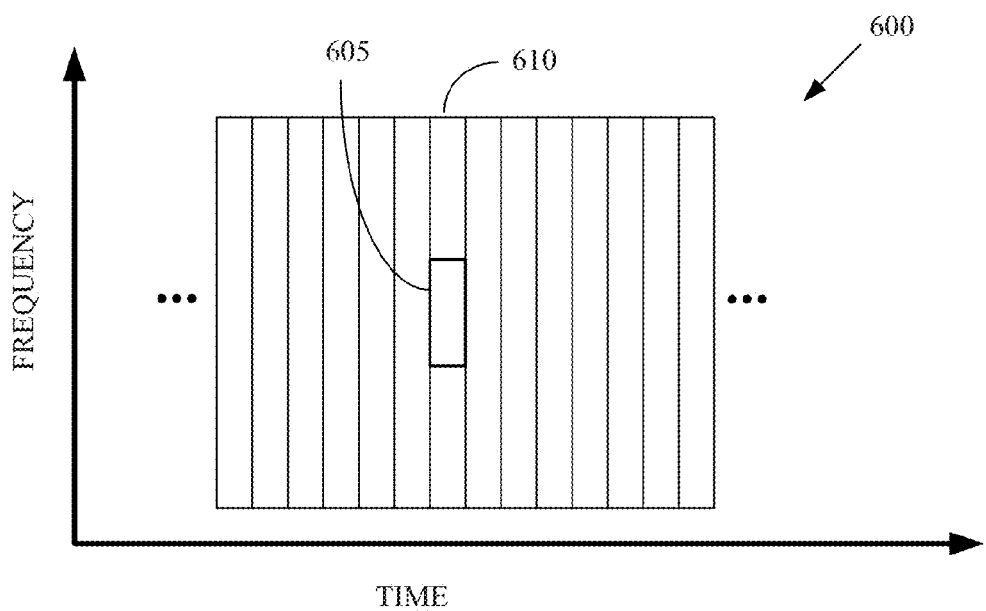
FIG. 6 conceptually illustrates a plurality of symbols.

FIG. 6 conceptually illustrates a plurality of symbols 600. In the illustrated embodiment, the horizontal axis indicates increasing time and the vertical axis indicates the different frequencies of the subcarriers that form the symbol. The acknowledgment preamble (AP) 605 is transmitted in the last symbol 610 of slot 0+2k or 10+2k. However, persons of ordinary skill in the art having benefit of the present disclosure should appreciate that alternative embodiments may use a different symbol for transmitting the AP 605, which may be fixed or dynamically allocated.

Figure 7:
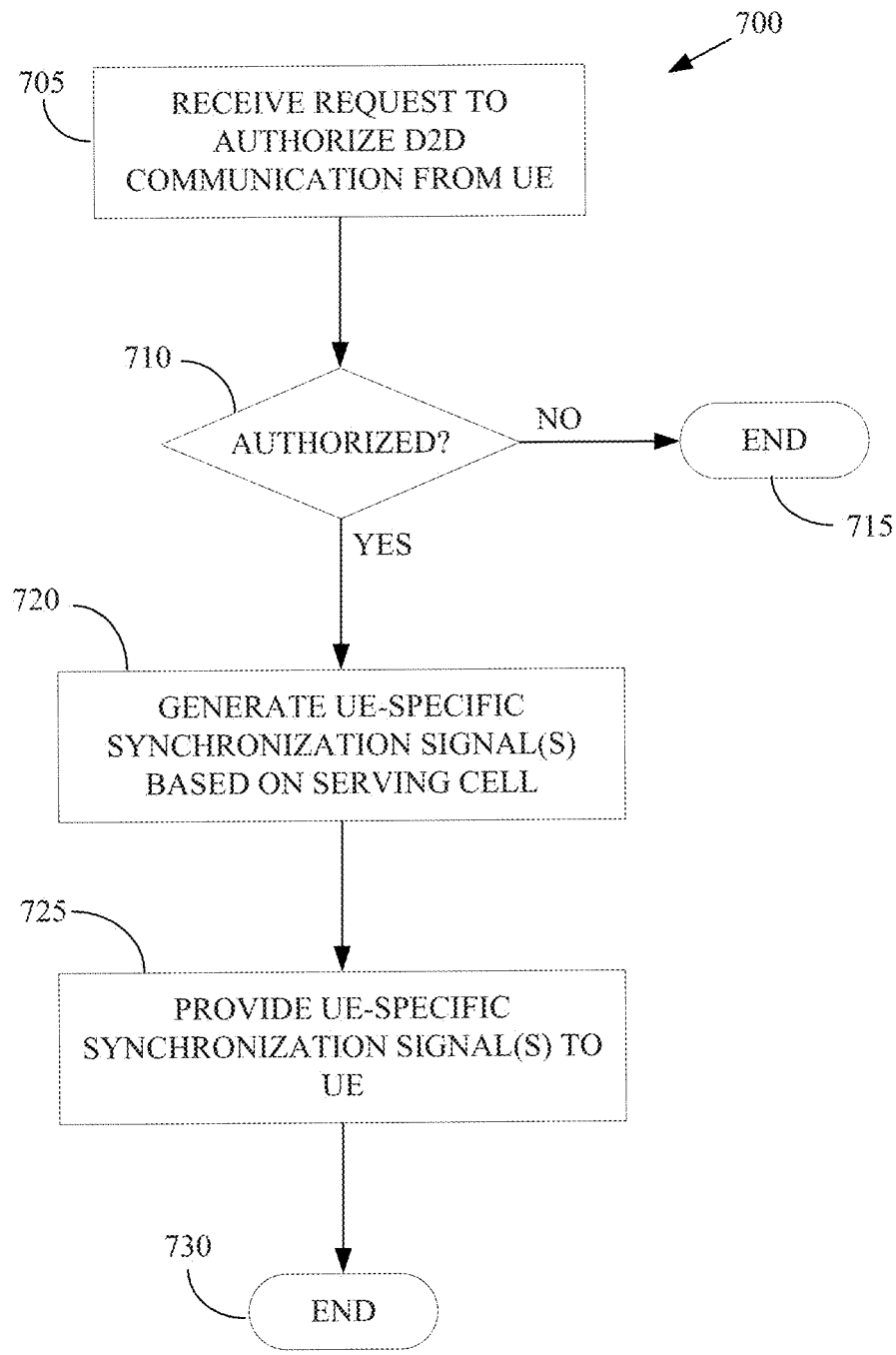
FIG. 7 conceptually illustrates one exemplary embodiment of a method that may be implemented in a controller such as the D2D controller shown in FIG. 1.

FIG. 7 conceptually illustrates one exemplary embodiment of a method 700 that may be implemented in a controller such as the D2D controller 125 shown in FIG. 1. In the illustrated embodiment, the controller receives (at 705) a request to authorize user equipment for D2D communication. As discussed herein, in different embodiments the request may be for network-assisted or network-absent D2D communication. The controller determines (at 710) whether the user equipment is authorized for D2D communication. In alternative embodiments, different authorization techniques may be used to determine (at 710) whether the user equipment is authorized. The particular technique is a matter of design choice. If the user equipment is not authorized, then the method 700 may end (at 715). The controller may generate (at 720) synchronization signals for authorized user equipment. In one embodiment, the controller generates (at 720) a UE-specific synchronization signal using parameters associated with the serving cell for the user equipment, as discussed herein. The controller may then provide (at 725) the UE-specific synchronization signal to the user equipment, e.g., by providing information indicative of the UE-specific synchronization signal to one or more base stations for transmission to the user equipment. The method 700 may then end (at 730).

Figure 8:
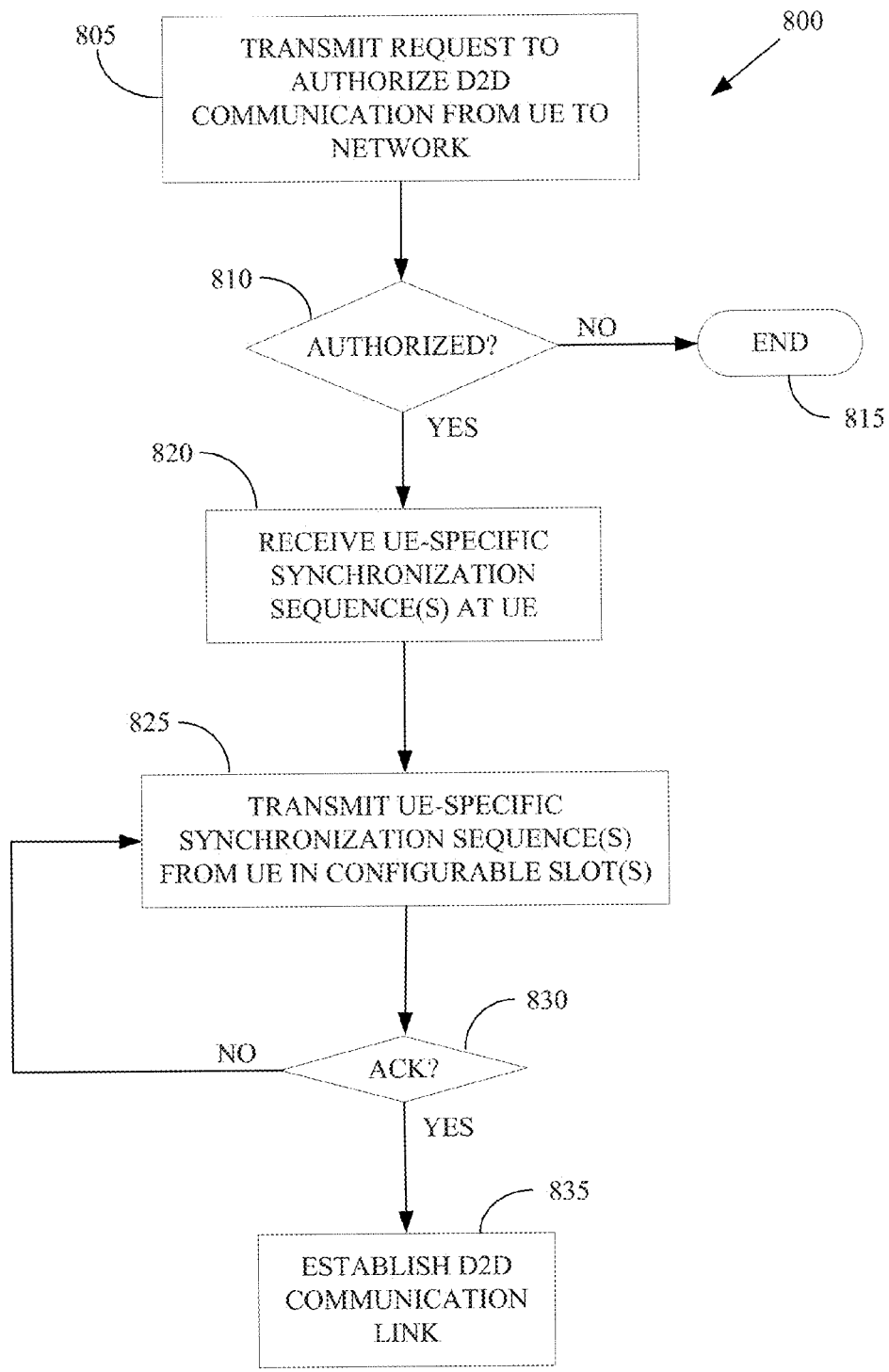
FIG. 8 conceptually illustrates one exemplary embodiment of a method that may be implemented in user equipment.

FIG. 8 conceptually illustrates one exemplary embodiment of the method 800 that may be implemented in user equipment. In the illustrated embodiment, user equipment transmits (at 805) a request to the network for authorization for D2D communication. If it is determined (at 810) that the user equipment is not authorized or cannot be authorized for D2D communication, then the method 800 may end (at 815). Authorized user equipment may receive (at 820) a UE-specific synchronization signal, which may be generated by a controller in the network using parameters associated with the serving cell for the user equipment, as discussed herein. The authorized user equipment may then transmit (at 825) the UE-specific synchronization signal over the air interface in configurable slots, as discussed herein. The authorized user equipment may continue to periodically transmit (at 825) the UE-specific synchronization signal until it receives (at 830) an acknowledgment preamble from another user equipment. The user equipment may then establish (at 835) a D2D communication link with the other user equipment using a handshaking protocol. As discussed herein, the communication may be network-assisted or may proceed in a network-absent mode.

Figure 9:
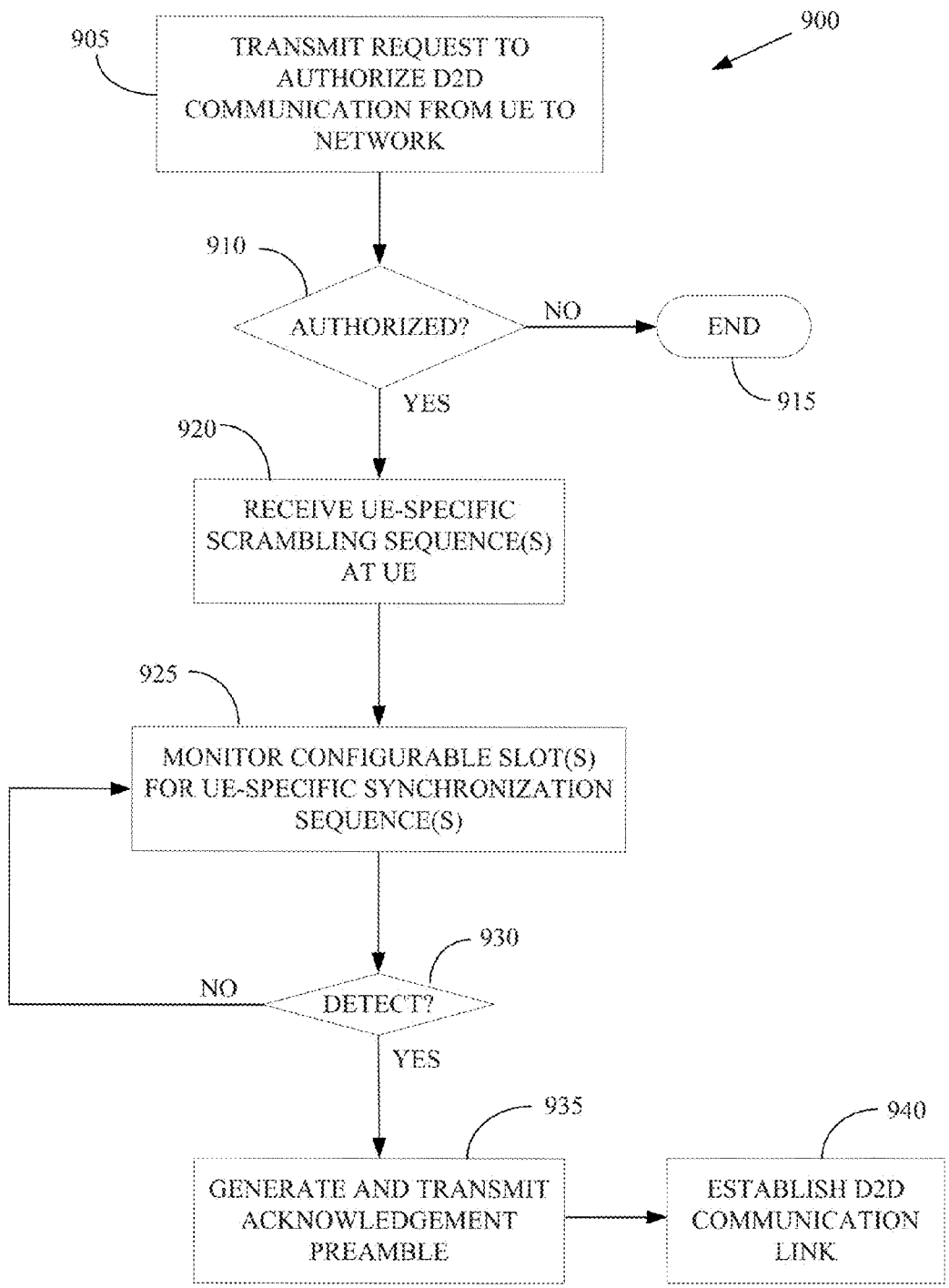
FIG. 9 conceptually illustrates one exemplary embodiment of a method that may be implemented in user equipment.

FIG. 9 conceptually illustrates one exemplary embodiment of the method 900 that may be implemented in user equipment. In the illustrated embodiment, user equipment transmits (at 905) a request to the network for authorization for D2D communication. If it is determined (at 910) that the user equipment is not authorized or cannot be authorized for D2D communication, then the method 900 may end (at 915). Authorized user equipment may receive (at 920) a UE-specific scrambling sequence, which may be generated by a controller in the network using parameters associated with the serving cell for the user equipment, as discussed herein. The scrambling sequence may identify other user equipment that are authorized for D2D communication and may be transmitting UE-specific synchronization signals that are scrambled using the scrambling sequence. The authorized user equipment may then monitor (at 925) the UE-specific synchronization signal over the air interface in configurable slots, as discussed herein. The authorized user equipment may continue to monitor (at 925) the UE-specific synchronization signal until it detects (at 930) a UE-specific synchronization signal that has been scrambled using the UE-specific scrambling sequence. The authorized user equipment may generate and transmit (at 935) an acknowledgment preamble, as discussed herein. The user equipment may then establish (at 940) a D2D communication link with the other user equipment. As discussed herein, the communication may be network-assisted or may proceed in a network-absent mode.

Portions of the disclosed subject matter and corresponding detailed description are presented in terms of software, or algorithms and symbolic representations of operations on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of the disclosed subject matter are typically encoded on some form of program storage medium or implemented over some type of transmission medium. The program storage medium may be magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. The disclosed subject matter is not limited by these aspects of any given implementation.

The particular embodiments disclosed above are illustrative only, as the disclosed subject matter may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed:

1. A method, comprising:
generating, at a controller, first information indicative of a first synchronization signal in response to a request from a first user equipment to be authenticated for device-to-device (D2D) communication with at least one second user equipment, the first information corresponding to a sequence used by a serving cell to generate a primary synchronization signal, wherein the serving cell is the serving cell for the first user equipment, and wherein the primary synchronization signal is for transmission by the serving cell for at least one of timing acquisition, cell identification, and cyclic prefix length detection for communication with the serving cell, wherein generating the first information indicative of the first synchronization signal comprises generating information indicative of a root index of a Zadoff-Chu sequence associated with the serving cell; and
providing the first information from the controller towards the first user equipment so that the first user equipment can transmit the first synchronization signal.

2. The method of claim 1, comprising generating second information indicative of a second synchronization signal using a physical layer cell identity of the serving cell and providing the second information to the first user equipment.

3. The method of claim 1, comprising authenticating the first user equipment for D2D communication with said at least one second user equipment, wherein the D2D communication uses a network timing reference.

4. The method of claim 3, wherein generating the first information indicative of the first synchronization signal comprises generating the first information using the root index of the Zadoff-Chu sequence associated with the serving cell and a scrambling sequence that identifies the first user equipment.

5. The method of claim 4, comprising providing the scrambling sequence to said at least one second user equipment.

6. The method of claim 1, comprising authenticating the first user equipment for D2D communication with said at least one second user equipment at a subsequent time when a network timing reference is not available.

7. A method, comprising:
providing, from a first user equipment, a request to be authenticated for device-to-device (D2D) communication with at least one second user equipment; and
receiving, at the first user equipment and in response to the request, first information indicative of a first synchronization signal corresponding to a sequence used by a serving cell to generate a primary synchronization signal, wherein the serving cell is the serving cell for the first user equipment, wherein the first user equipment receives the primary synchronization signal for at least one of timing acquisition, cell identification, and cyclic prefix length detection for communication with the serving cell, and wherein receiving the first information indicative of the first synchronization signal comprises receiving information indicative of a root index of a Zadoff-Chu sequence associated with the serving cell.

8. A method, comprising;
providing, from a first user equipment, a request to be authenticated for device-to-device (D2D) communication with at least one second user equipment;
receiving, at the first user equipment and in response to the request, first information indicative of a first synchronization signal corresponding to a sequence used by a serving cell to generate a primary synchronization signal, wherein the serving cell is the serving cell for the first user equipment, and wherein the first user equipment receives the primary synchronization signal for at least one of timing acquisition, cell identification, and cyclic prefix length detection for communication with the serving cell, wherein receiving the first information comprises receiving a scrambling sequence that identifies the first user equipment;
receiving second information indicative of a second synchronization signal generated using a physical layer cell identity of the serving cell; and
transmitting the first synchronization signal and the second synchronization signal in configurable symbols of configurable slots of a subframe using a network timing reference at a configurable power level.

9. The method of claim 8, comprising transmitting a sounding reference signal, and wherein transmitting the first and second synchronization signals comprises transmitting the first and second synchronization signals at a configurable symbol offset from the sounding reference signal and in the same subframe as the sounding reference signal.

10. The method of claim 8, comprising determining that a network is not available based on a configurable number of failed attempts to access the network and transmitting the first synchronization signal and the second synchronization signal in response to determining that the network is not available.

11. The method of claim 10, wherein transmitting the first and second synchronization signals comprises transmitting the first and second synchronization signals based on a random timing reference provided by an oscillator in the first user equipment, subframe timing configured prior to the network becoming unavailable, or subframe timing based on a Global Positioning System reference time.

12. The method of claim 10, wherein transmitting the first and second synchronization signal comprises transmitting the first and second synchronization signals at a power level that iteratively increases from a minimum to a maximum over successive time intervals.

13. The method of claim 10, comprising transmitting a sounding reference signal in response to determining that the network is not available.

14. The method of claim 13, wherein transmitting the sounding reference signal comprises transmitting the sounding reference signal at a random cyclic shift or a configurable cyclic shift relative to the first and second synchronization signals.

15. The method of claim 8, comprising receiving an acknowledgment preamble from said at least one second user equipment in response to transmitting the first and second synchronization signals.

16. The method of claim 15, comprising establishing a D2D communication link between the first user equipment and said at least one second user equipment in response to receiving the acknowledgment preamble.

17. A controller configurable for deployment in a network, the controller comprising:
a memory; and
an electronic computing device configured to access the memory to:
generate first information indicative of a first synchronization signal in response to a request from a first user equipment to be authenticated for device-to-device (D2D) communication with at least one second user equipment, the first information corresponding to a sequence used by a serving cell to generate a primary synchronization signal, wherein the serving cell is the serving cell for the first user equipment, and wherein the primary synchronization signal is for transmission by the serving cell for at least one of timing acquisition, cell identification, and cyclic prefix length detection for communication with the serving cell, wherein the controller is configurable to generate information indicative of a root index of a Zadoff-Chu sequence associated with the serving cell and
provide the first information to the first user equipment so that the first user equipment can transmit the first synchronization signal.

18. The controller of claim 17, wherein the controller is configurable to generate second information indicative of a second synchronization signal using a physical layer cell identity of the serving cell, and wherein the controller is configurable to provide the second information to the first user equipment.

19. The controller of claim 17, wherein the electronic computing device is configurable to authenticate the first user equipment for D2D communication with said at least one second user equipment, wherein the D2D communication uses a timing reference provided by the network.

20. The controller of claim 19, wherein the electronic computing device is configurable to generate the first information using the root index of the Zadoff-Chu sequence associated with the serving cell and a scrambling sequence that identifies the first user equipment.

21. The controller of claim 20, wherein the electronic computing device is configurable to provide the scrambling sequence to said at least one second user equipment.

22. The controller of claim 17, wherein the electronic computing device is configurable to authenticate the first user equipment for D2D communication with said at least one second user equipment at a subsequent time when a network timing reference is not available.

23. User equipment comprising:
a memory; and
an electronic computing device configured to access the memory to:
provide a request to be authenticated for device-to-device (D2D) communication with at least one other user equipment; and receive, in response to the request, first information indicative of a first synchronization signal corresponding to a sequence used by a serving cell to generate a primary synchronization signal, wherein the serving cell is the serving cell for the user equipment, wherein the user equipment is to receive the primary synchronization signal for at least one of timing acquisition, cell identification, and cyclic prefix length detection for communication with the serving cell, and wherein the first information is indicative of a root index of a Zadoff-Chu sequence associated with the serving cell.

24. User equipment comprising:
a memory; and
an electronic computing device configured to access the memory to:
provide a request to be authenticated for device-to-device (D2D) communication with at least one other user equipment;
receive, in response to the request, first information indicative of a first synchronization signal corresponding to a sequence used by a serving cell to generate a primary synchronization signal, wherein the serving cell is the serving cell for the user equipment, and wherein the user equipment is to receive the primary synchronization signal for at least one of timing acquisition, cell identification, and cyclic prefix length detection for communication with the serving cell;
receive a scrambling sequence that identifies the user equipment;
generate the first synchronization signal using the scrambling sequence and the sequence used to generate the primary synchronization signal for transmission by the serving cell;
receive second information indicative of a second synchronization signal generated using a physical layer cell identity of the serving cell; and
transmit the first synchronization signal and the second synchronization signal in configurable symbols of configurable slots of a subframe using a network timing reference at a configurable power level.

25. The user equipment of claim 24, wherein the electronic computing device is configurable to transmit a sounding reference signal, and wherein the user equipment is configurable to transmit the first and second synchronization signals at a configurable symbol offset from the sounding reference signal and in the same subframe as the sounding reference signal.

26. The user equipment of claim 24, wherein the electronic computing device is configurable to determine that a network is not available based on a configurable number of failed attempts to access the network, and wherein the user equipment is configurable to transmit the first synchronization signal and the second synchronization signal in response to determining that the network is not available.

27. The user equipment of claim 26, wherein the electronic computing device is configurable to transmit the first and second synchronization signals based on a random timing reference provided by an oscillator in the user equipment, subframe timing configured prior to the network becoming unavailable, or subframe timing based on a Global Positioning System reference time.

28. The user equipment of claim 26, wherein the electronic computing device is configurable to transmit the first and second synchronization signals at a power level that iteratively increases from a minimum to a maximum over successive time intervals.

29. The user equipment of claim 26, wherein the electronic computing device is configurable to transmit a sounding reference signal in response to determining that the network is not available.

30. The user equipment of claim 29, wherein the electronic computing device is configurable to transmit the sounding reference signal at a random cyclic shift or a configurable cyclic shift relative to the first and second synchronization signals.

31. The user equipment of claim 24, wherein the electronic computing device is configurable to receive an acknowledgment preamble from said at least one other user equipment in response to transmitting the first and second synchronization signals.

32. User equipment comprising:
a memory; and
an electronic computing device configured to access the memory to:
provide a request to be authenticated for device-to-device (D2D) communication with at least one other user equipment;
receive, in response to the request, first information indicative of a first synchronization signal corresponding to a sequence used by a serving cell to generate a primary synchronization signal, wherein the serving cell is the serving cell for the user equipment, and wherein the user equipment is to receive the primary synchronization signal for at least one of timing acquisition, cell identification, and cyclic prefix length detection for communication with the serving cell;
receive a scrambling sequence that identifies the user equipment;
generate the first synchronization signal using the scrambling sequence and the sequence used to generate the primary synchronization signal for transmission by the serving cell;
receive second information indicative of a second synchronization signal generated using a physical layer cell identity of the serving cell, wherein the electronic computing device is configurable to detect at least one third synchronization signal transmitted by said at least one other user equipment that is authenticated for device-to-device (D2D) communication, wherein said at least one third synchronization signal corresponds to a sequence used to generate a primary synchronization signal for transmission by a serving cell for said at least one other user equipment.

33. The user equipment of claim 32, wherein the electronic computing device is configurable to transmit an acknowledgment preamble in response to detecting said at least one third synchronization signal.

34. The user equipment of claim 33, wherein the electronic computing device is configurable to detect at least one fourth synchronization signal transmitted by said at least one other user equipment, wherein the second synchronization signal is generated using a physical layer cell identity of the serving cell of said at least one other user equipment.

35. The user equipment of claim 34, wherein the electronic computing device is configurable to synchronize timing with said at least one other user equipment based on at least one of the first, second, at least one third, or at least one fourth synchronization signals.

36. The user equipment of claim 35, wherein the electronic computing device is configurable to establish a D2D communication link with said at least one second user equipment.

* * * * *